INVENTORS
Lawrence Povlacs
Victor A. Von Haase

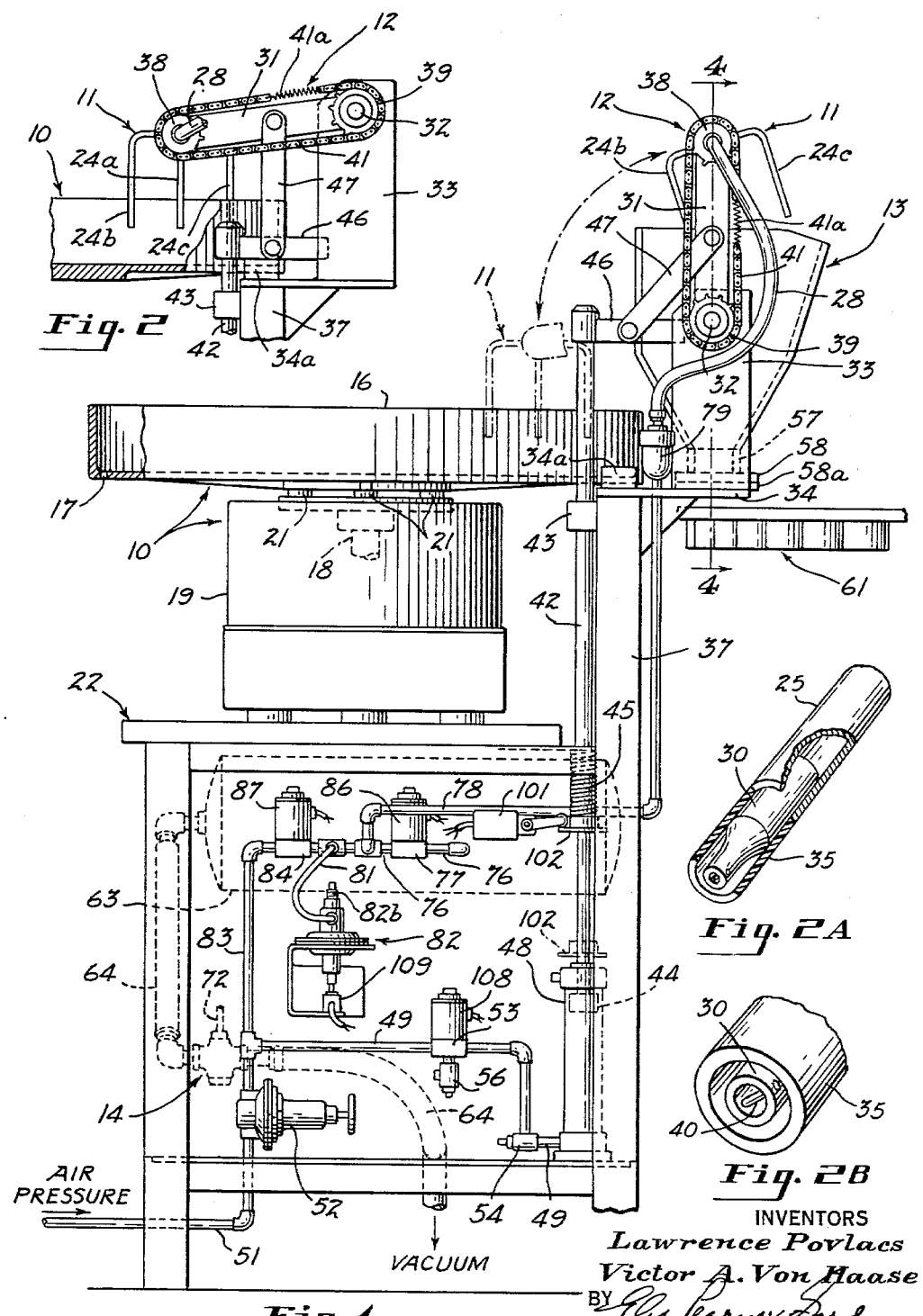

INVENTORS
Lawrence Povlacs
Victor A. Von Haase
BY
ATTORNEYS

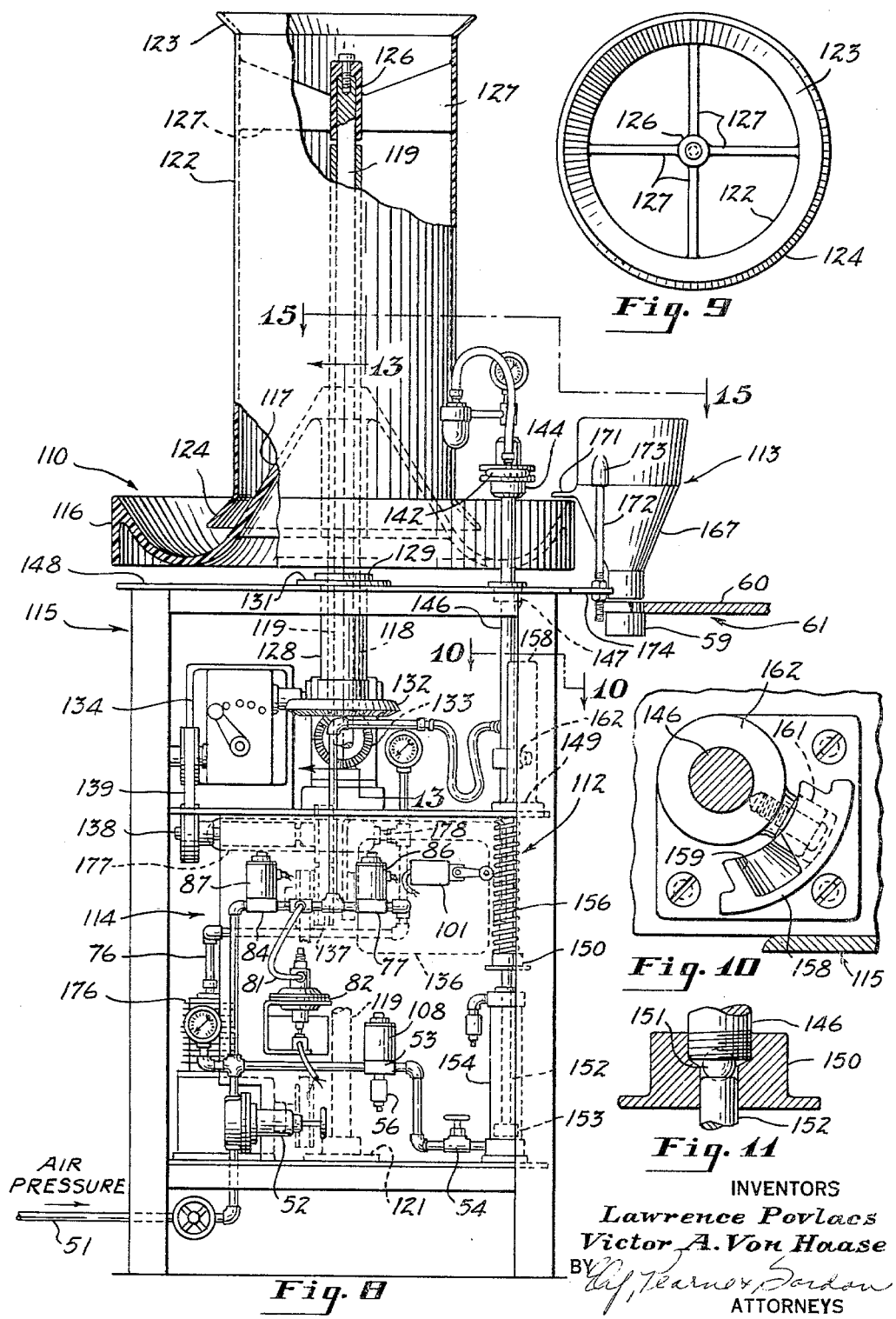

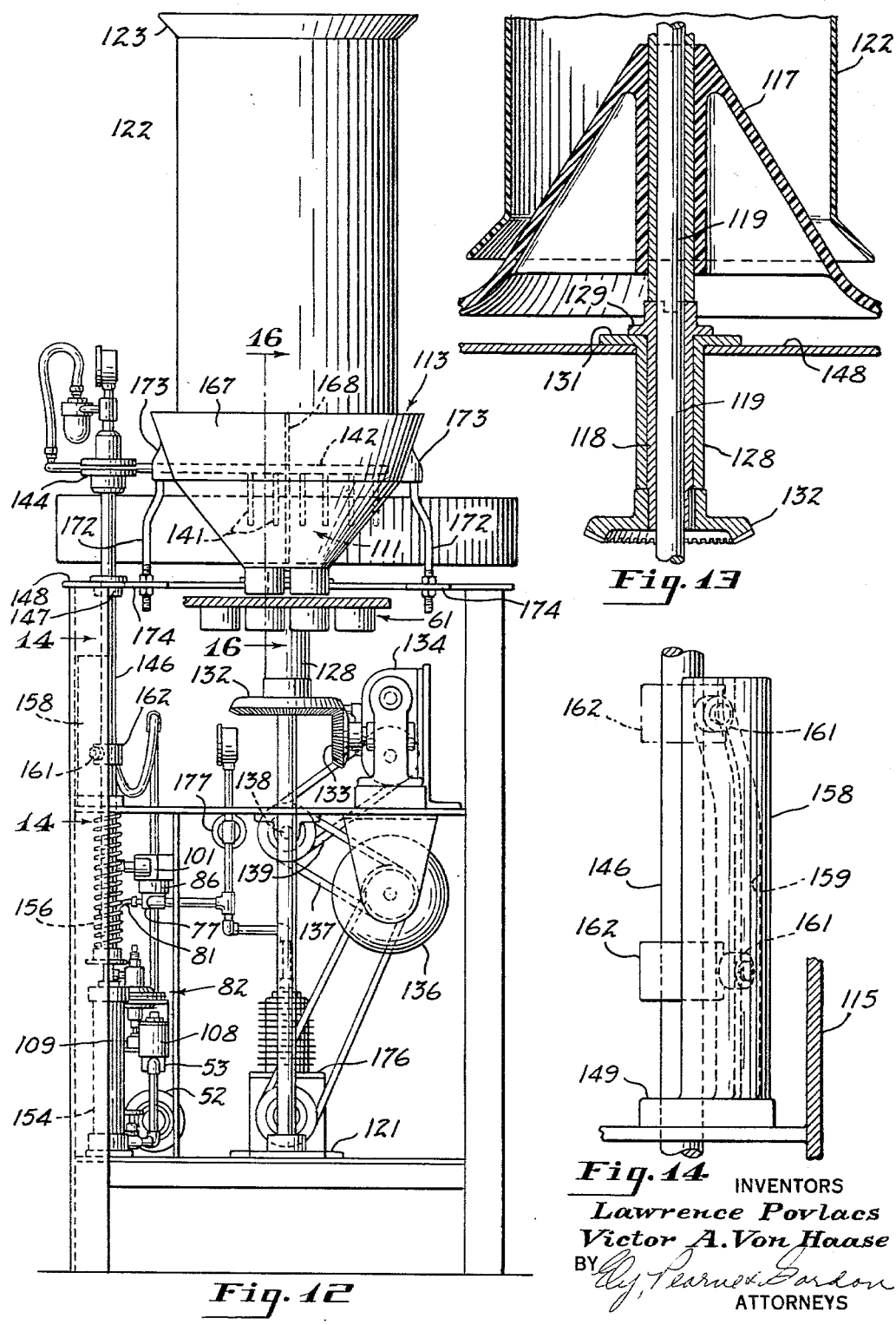

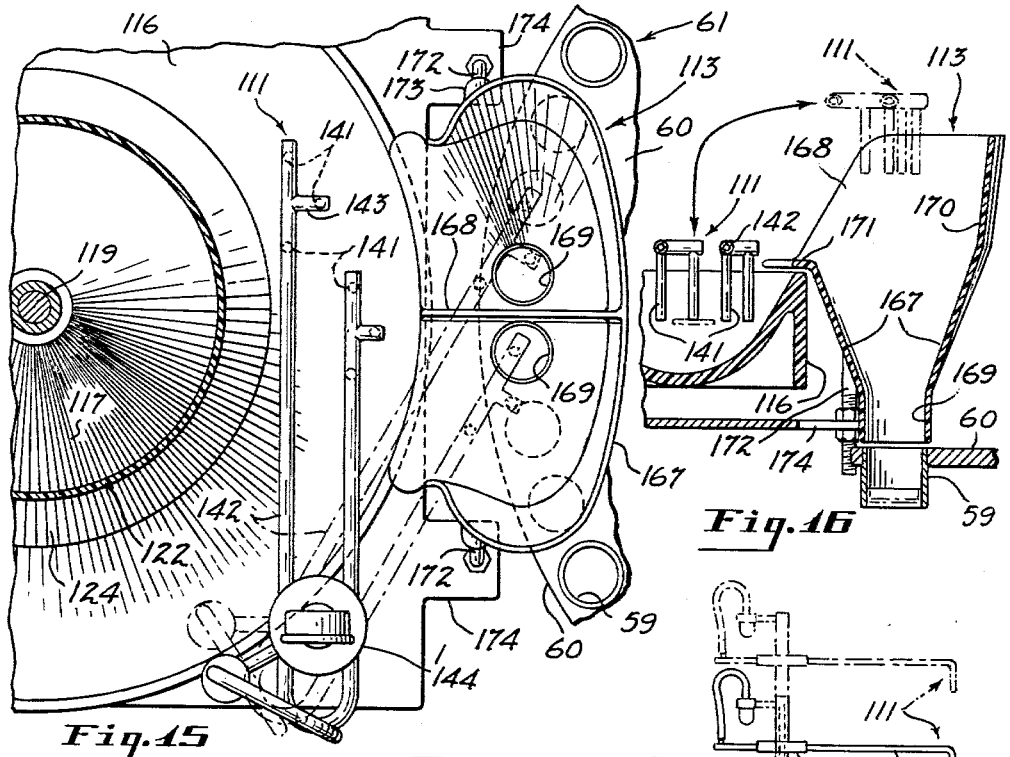

United States Patent Office 3,253,719
Patented May 31, 1966

3,253,719
ARTICLE FEEDING MACHINES
Lawrence Povlacs, Springfield Township, Ohio, and Victor A. von Haase, Fort Myers, Fla., assignors to The Akwell Corporation, Akron, Ohio, a corporation of Delaware
Filed Feb. 18, 1964, Ser. No. 345,708
13 Claims. (Cl. 214—1)

This invention relates to article feeding machines and, particularly, to machines for delivering irregularly shaped soft articles from a source of supply to a packaging machine at intervals timed to the operation of the packaging machine. Still more particularly, the invention relates to machines of the type referred to that are adapted to pick up one, two, or more such articles at a time and deliver them into a receptacle, such as a funnel, associated with a packaging machine for packaging the articles as they fall at intervals, in the selected number at each interval, from the throat of the funnel or the like into a package moved into position by the packaging machine.

The types of articles to be delivered to a packaging machine and for which the present invention has been particularly designed are thin articles of rubber or the like, such as rubber balloons, prophylactic devices, and devices of a similar character which, by virtue of their soft texture and irregular shapes are unsuited for most types of mechanical delivery from a supply bin to a desired receptacle. Heretofore, it has generally been necessary in delivering such articles from a supply bin to a packaging machine or the like to perform that operation, at least in part, by manually segregating and moving the articles in groups of the desired number and at the desired intervals to the receptacle for receiving them. That operation has been particularly troublesome to perform in an entirely automatic manner when the articles must be moved from a hopper or bin in which they are completely randomly disposed in large numbers as they fall into the bin from a manufacturing operation or are dumped into the bin from containers in which they have been previously packaged in bulk.

An illustrative packaging machine and packing operation and illustrative articles to be packaged are described and claimed in the copending application of Lawrence Povlacs, Ser. No. 183,798, filed Mar. 30, 1962, now Patent No. 3,190,055. In that machine, a conveyor that defines a continuous series of uniformly spaced, upwardly opening pockets moves stepwise past a station at which box bottoms to be filled are placed, one at a time, into each of the pockets as they stop in sequence at that station. The desired number of articles of the general character mentioned above slide or fall into each of the pockets as they stop in sequence at a second station for this purpose. At subsequent stations, box tops are fed to the conveyor and placed one at a time into the pockets or in alignment with the pockets, the box bottoms and tops are brought into closed relationship, and the filled box is ejected from the machine.

While the present invention has been especially designed for use in combination with the machine of that copending Povlacs application, the invention in its broader aspects, is not dependent upon or limited to use in combination with any particular kind of packaging machine or other particular type of machine. It is suitable for feeding articles of a wide variety of machines in which any of numerous operations may be performed upon the articles, and even for feeding articles to an operator who inspects the articles or performs some kind of manual operation on them.

The objects of the invention are to provide a machine capable of receiving articles of the type referred to in bulk, without requiring that the articles be arranged or sorted in any particular relative positions, and delivering at predetermined time intervals any desired number of the articles from the bulk supply to a funnel or chute or any other kind of article receiver including, for example, a container in which the goods are to be finally packaged; to provide such a machine which will, without fail, repeatedly deliver the exact number of such articles in continuous sequence; to provide such a machine having a mode of operation such that the machine can be coordinated in a fail-safe manner with a machine to receive the articles, as for packaging; to provide suitable interlocks for stopping the feeding machine in the event the packaging machine or the like should not be ready to receive the articles and for stopping the packaging machine or the like in the event the feeding machine should not deliver the articles when the packaging machine or the like is ready to receive them; and to provide for continuing operation of the feeding machine and associated machine as soon as either of them, after being delayed, has caught up with the operation of its companion machine.

Other objects of the invention are to accomplish all of the foregoing in a simple manner with compact machinery and at a cost that is moderate in view of the labor saving function to be performed.

In accordance with the illustrative embodiments of the invention shown and described herein, the foregoing objects of the invention are achieved by a machine that utilizes vacuum fingers for engaging and picking up the articles to be fed, each vacuum finger having an opening in a free end thereof to which vacuum may be applied and which is sufficiently small so that there is virtually no possibility of two articles being held against the end of any one finger by the vacuum applied thereto. The number of fingers mounted and moved together for this purpose is determined by the number of articles to be fed at any one time to any one compartment, feeding passageway, or other location and also by the number of such compartments, feeding passageways, or locations that are to be fed with articles simultaneously. In operation, the fingers are moved generally endwise into the bulk supply of the articles to engage the vacuum opening in the end of each finger with an article. Thereupon, vacuum is applied to all of the fingers from a common conduit for holding one article on the end of each finger as the fingers are moved into position for dropping the articles into the proper compartment or feeding passageway or the like and in the proper numbers. Discharge of the articles may be effected in some instances by merely breaking the vacuum in the common vacuum conduit connected to the several fingers, but is preferably assisted by momentarily feeding air under pressure to the fingers to discharge a brief blast of air through the finger openings.

A feature of the invention that assists in preventing any two fingers from engaging and jointly picking up the same article, rather than separate articles, is that the fingers are spaced apart a distance greater than the maximum dimension of the articles being handled. Thus, one article in the bulk supply cannot be engaged and delivered by more than one finger.

Another feature of the invention is that the opening in the end of each vacuum finger for applying suction to an article to be held thereby is sufficiently restricted so that thin rubber goods and the like cannot be sucked even partially into the opening so as to become jammed therein and resist being discharged at the proper time.

Still another feature of the invention, and one of particular importance, is a provision for instantly stopping and reversing the travel of the vacuum fingers toward their discharge locations if a finger should fail to pick up an article at its pick-up location or should drop an article prematurely while moving toward the discharge location. This is accomplished by means of pressure responsive controls for the finger actuating mechanism whereby it starts movement of the fingers from the pick-up to the discharge locations when vacuum is built up in each of the fingers by blocking of the open ends thereof by articles to be picked up thereby and instantly stops and reverses if any of the articles should fail to be picked up by or prematurely fall off of any of the fingers so as to disrupt the vacuum therein.

The foregoing and other objects, features, and advantages of the invention will be better understood and more fully appreciated from the following detailed description of two specific embodiments of the invention, and from the accompanying drawings thereof to which the description refers.

In the drawings:

FIG. 1 is an elevational view of a presently preferred feeding machine as designed for use in combination with the packaging machine of the aforementioned, copending, Povlacs application, a fragment of the packaging machine conveyor also being shown.

FIG. 2 is a fragmentary elevation of portions of the feeding machine of FIG. 1 with the vacuum fingers thereon disposed for picking up articles.

FIG. 2A and 2B are, respectively, slightly enlarged and considerably enlarged, fragmentary, prespective views of the free end of a vacuum finger that has been partially broken away in FIG. 2A to show certain details of its construction.

FIG. 4 is a fragmentary, vertical sectional view of the feeding machine of FIG. 1, the plane of the section being indicated by the line 4—4 in FIG. 1.

Figure 5:
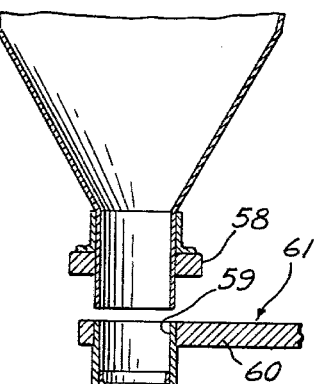
Figure 6:
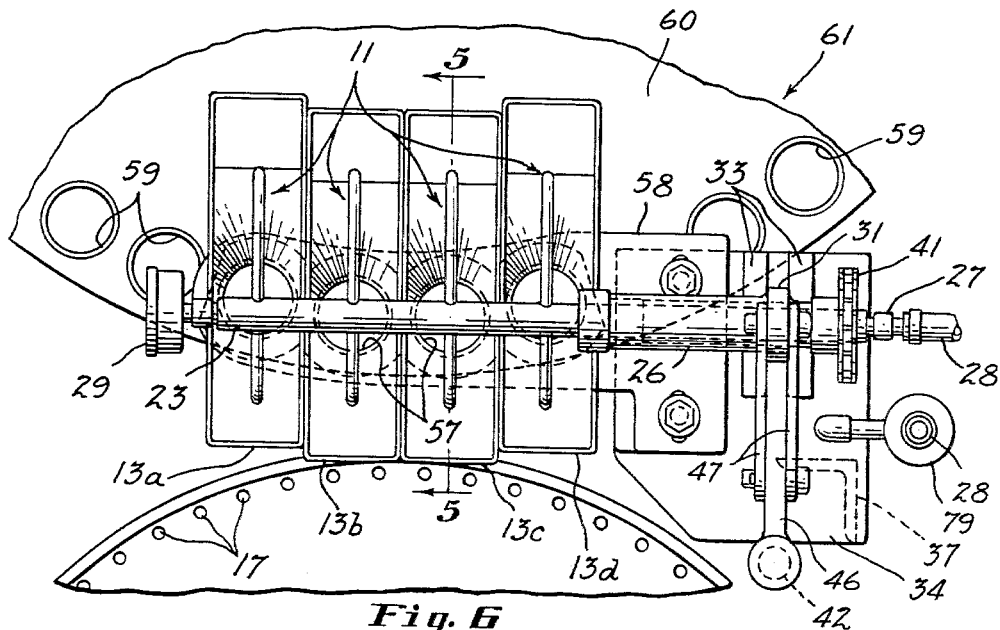

FIG. 5 is a vertical sectional view through one compartment of a multiple compartment funnel on the feeding machine of FIG. 1 and through a pocket on the conveyor of the associated packaging machine, the funnel compartment being disposed to receive three articles from three vacuum fingers which, in their discharge positions, are aligned therewith, and the plane of the section being indicated by the line 5—5 in FIG. 6.

FIG. 6 is a fragmentary plan view of the feeding machine and associated packaging machine of FIG. 1.

Figure 7:
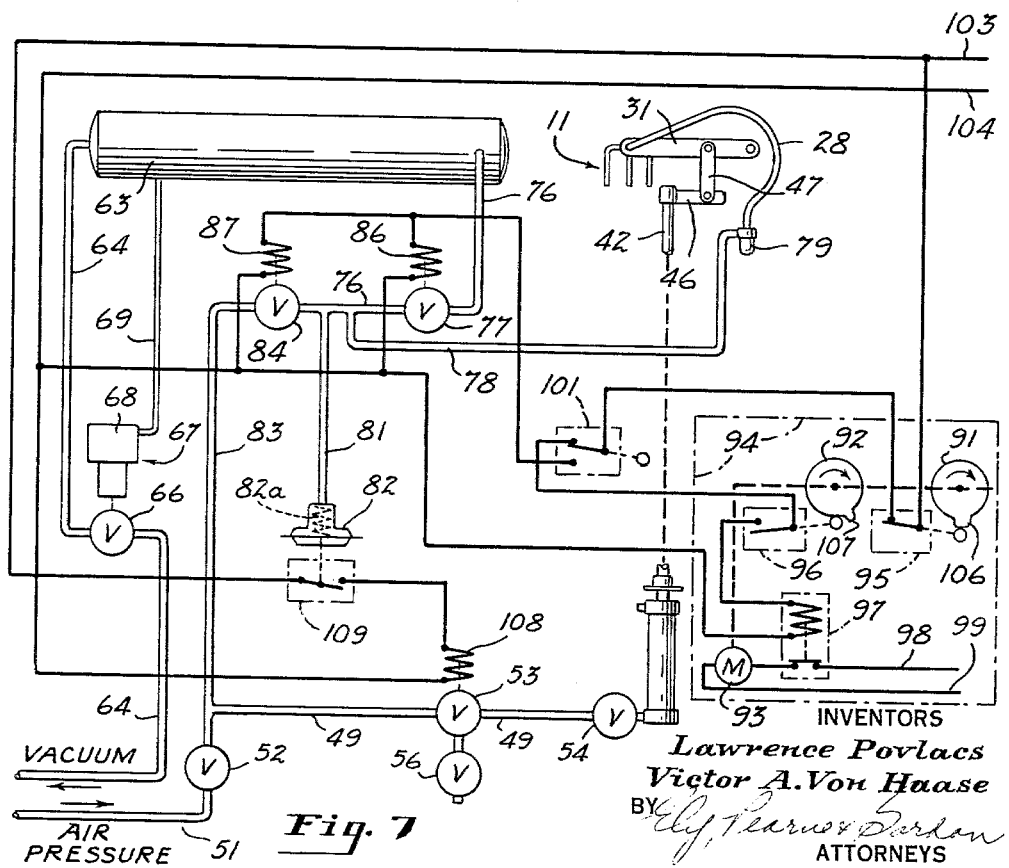

FIG. 7 is a diagrammatic representation of pneumatic and electrical circuits for operating the feeding machine of FIG. 1 and coordinating the operation of the feeding and packaging machines.

FIG. 8 is an elevational view, with parts broken away and shown in section, of another embodiment of the invention in operative relationship with the conveyor of the same packaging machine.

FIG. 9 is a plan view of the bulk storage receptacle of the feeding machine of FIG. 8 from which the bulk articles move by gravity to a location to be picked up by the vacuum fingers.

FIG. 10 is a fragmentary, horizontal, sectional view of the feeding machine of FIG. 8, the plane of the section being indicated by the line 10—10 in FIG. 8.

FIG. 11 is a fragmentary, vertical, sectional view of the thrust bearing and associated supporting shaft on the feeding machine frame that rotatingly support the bulk storage receptacle of the machine.

FIG. 12 is an end elevational view of the feeding machine of FIG. 8 in operative relationship with the conveyor of the same packaging machine.

FIG. 13 is a fragmentary, vertical sectional view of the feeding machine of FIG. 8, the plane of the section being indicated by the line 13—13 in FIG. 8.

FIG. 14 is a fragmentary, elevational view of a portion of the feeding machine of FIG. 8 which supports and moves the vacuum fingers along a predetermined path.

FIG. 15 is a fragmentary plan view of the feeding machine and packaging machine conveyor of FIG. 8, the former being partly shown in section as indicated by the lines 15—15 in FIG. 8.

FIG. 16 is a fragmentary, vertical, sectional view of the feeding machine and packaging machine conveyor of FIG. 8, showing the path of movement of the vacuum fingers from a position for picking up articles from a stationary pan or tray to a position for dropping the articles into a double compartment, article feeding funnel.

FIG. 17 is a diagrammatic representation of pneumatic and electrical circuits for operating the feeding machine of FIG. 8 and coordinating the operation of the feeding and packaging machines.

MACHINE OF FIGS. 1–7

Referring to FIGS. 1–7 of the drawings, the main components of the feeding machine comprise the following:

(1) A supply pan and rotating and vibrating mechanism therefor, both being generally designated 10 and being adapted to hold and move a supply of articles to the vacuum fingers of the feeding machine. Rotation and vibration of the supply pan serve to maintain a substantially uniform depth of the articles in the pan and to prevent the vacuum fingers from repeatedly picking up articles from the same zone in the pan, which would deplete the supply in that zone. The articles to be fed may be delivered loosely in bulk into the pan from a chute or hopper or the like, not shown, or may be simply dumped by hand into the pan from bulk containers. The vibration of the pan assists in leveling out an excessively high, localized pile of the articles that may result from supplying articles to the pan in the latter manner.

(2) An assembly 11 of a plurality of spaced groups of vacuum fingers, there being three vacuum fingers in each group in this embodiment of the invention.

(3) A mechanism 12 for supporting and moving the vacuum fingers between pick-up and discharge positions. In their pick-up positions, the vacuum fingers have been lowered to depend vertically downwardly into the supply pan for engaging articles to be picked up thereby. In their discharge positions, the fingers have been moved upwardly and outwardly beyond the periphery of the supply pan so as to dispose the groups of fingers, respectively, above a corresponding plurality of compartments of a multiple compartment funnel for dropping the articles from the fingers of any one group into the same funnel compartment therebelow.

(4) The multiple compartment funnel 13 through which articles are simultaneously dropped from the vacuum fingers into each of four pockets of the packaging machine. Box bottoms to receive the articles will have been previously placed in the four pockets, and the pockets will have advanced to positions below the four funnel compartments, respectively, for receiving articles therefrom.

(5) A pneumatic and electrical control system 14 connected to the fingers of the vacuum finger assembly 11 for supplying vacuum thereto while they are picking up articles and delivering them to points above the compartments of the multiple compartment funnel 13, and for substituting air pressure for the vacuum when the vacuum fingers are in position for dropping articles into the compartments of the funnel. As hereinafter described in detail, this control system also controls the movement of the vacuum fingers in such a manner that they will reverse and return to the supply pan for repeating the operation of picking up articles whenever one or more of the fingers fails to pick up an article or drops the article it has picked up before reaching the discharge position above the funnel 13; and it also maintains coordination of the operation of the feeding machine and the packaging machine.

Each of the above identified main components of the feeding machine will now be described in detail as they are constructed and arranged in the embodiment of the invention shown in FIGS. 1 to 7, inclusive.

SUPPLY PAN AND ROTATING AND VIBRATING MECHANISM 10

The supply pan and rotating and vibrating mechanism 10 are generally of such a conventional design and so well known to those skilled in the art that they are shown in the drawings (FIGS. 1 and 3) and will be described herein with a minimum of detail. The supply pan, designated 16, may have a substantially vertical side wall and a generally flat bottom preferably provided with a multiplicity of small holes 17 through which dirt and fine debris may be discharged as it accumulates. The proportions of the pan 16 are selected to hold articles in that annular zone to a depth such that a multiplicity of articles will normally lie on top of one another throughout that zone, whereby the removal of an article at any point will not expose the bottom of the pan.

The supply pan 16 is mounted on a vertical shaft 18 for continuous axial rotation at a relatively slow rate of speed by means of a power unit 19. An array of spacer pads 21 is disposed about the pan shaft 18 between the bottom of the pan and the power unit, and vibration of the pan is also imparted by the power unit, through these spacer pads, as the pan is rotated. As noted above, the vibration of the rotating pan tends to keep the supply of articles in the pan, moving radially outward toward the annular zone into which the vacuum fingers dip, and the rotation of the pan insures that the vacuum fingers will not dip into the same part of that zone on any two successive cycles of movement of the finger assembly 11. Thus, a supply of articles where the fingers dip into the pan will be insured so long as the supply of such articles in the pan is not substantially depleted.

The supply pan and rotating and vibrating mechanism 10 may be mounted on a flat top table, generally designated 22, which also serves as a mounting structure for the other components of the feeding machine.

ASSEMBLY 11 OF VACUUM FINGERS

The assembly 11 of vacuum fingers, shown in each of FIGS. 1-4 and 6, may include (within reasonable limits) any desired number of vacuum fingers, which may be arranged in groups with any desired number of fingers in each group. As shown, there are four groups (FIGS. 3 and 6) of three fingers each (FIG. 2). Each finger may be made of hollow metal tubing having a restricted opening at its lower end and an upper end attached to and communicating with a hollow, horizontal, manifold shaft 23 that is mounted for rotation about its axis as hereinafter described.

Each group of three fingers may suitably comprise a central finger 24a projecting radially from the manifold shaft 23 (FIG. 4) between a pair of symmetrically arranged outer fingers 24b and 24c, the latter extending radially from the manifold shaft 23 in opposite directions and then being bent at approximately right angles (FIGS. 1 and 2) to extend downwardly parallel to the central finger 24a. The lower open ends of the fingers preferably all terminate in a common plane which is parallel to the bottom of the pan 16 when the fingers are disposed in position for picking up articles from the pan (FIGS. 1 and 2).

FIGS. 2A and 2B show the free open end of a vacuum finger, such as 24a, 24b, or 24c, that is suitable for picking up rolled prophylactics of the type shown in the aforementioned, copending, Povlacs application. For most of its length from the upper end of the finger, it may consist of a length of ¼" O.D. metal tubing 25 having a short length of ⅛" O.D. metal tubing 30 that is press-fitted and soldered in the free end thereof and that projects therebeyond. The tubing 30 is necked down to a still smaller diameter at its projecting end and has a bore therethrough of about .04 to .05 inch. The projecting end of the short length of smaller tubing 30 may be surrounded by a short length of soft tubing 35 of any moderately elastic, synthetic, rubber-like material telescoped thereon with a tight, gripping fit with one end of the elastomeric tubing 35 abutted against the end of the larger tubing 25 and with the opposite end of the elastomeric tubing projecting only slightly beyond the open tip of the short metal tubing 30. As a barrier against sucking any substantial part of the thin prophylactic material into the tip of the short metal tubing 30, it may be drilled through diametrically very close to its tip to receive a short piece of wire 40 of about .01 inch in diameter with a tight fit. Other tip forms may be found more suitable for handling other kinds of goods.

The manifold shaft 23 carrying the groups of vacuum fingers extends at one end into and through a mounting sleeve 26 to a coupling 27 for a vacuum and air pressure line 28 of flexible hose material. The mounting sleeve 26 serves as an elongated bearing for supporting the manifold shaft as a cantilever while permitting it to rotate within the sleeve. The opposite or free end of the manifold shaft 23 may suitably be connected in communication with a vacuum gage 29 for reading the degree of vacuum supplied to the vacuum fingers.

VACUUM FINGER MOVING MECHANISM 12

For supporting and moving the vacuum fingers, the mounting sleeve 26 is rigidly connected to one end of an oscillating arm 31 having its opposite end journaled for free rotation on a stub shaft 32. One end of the stub shaft 32 is secured against rotation in aligned apertures formed in a pair of spaced mounting plates 33, which are welded to a support plate 34. A set screw 36 serves to prevent rotation of the stub shaft 32 while permitting its easy removal. The support plate 34, in turn, is rigidly mounted in any desired manner above the table 22 at one corner thereof, as by welding it to an upwardly projecting post 37 integrally connected to the table framework.

In operation, the oscillating arm 31 swings between the extreme positions shown in FIGS. 1 and 2. This oscillation of the arm 31, in addition to moving the vacuum fingers bodily back and forth between the extreme positions shown in FIGS. 1 and 2, also causes oscillation of the manifold shaft 23 about its own axis for maintaining the vacuum fingers properly oriented in a generally depending direction. This is accomplished by means of a pair of sprockets 38 and 39 that are respectively rigidly secured on one end of the manifold shaft 23 and on one end of the non-rotating stub shaft 32 and are interconnected by a drive chain 41. As will be apparent from the fact that the shaft 32 and its sprocket 39 are stationary whereas the oscillating arm 31 swings about its axis, the drive chain 41 causes rotation of the sprocket 38 relative to the arm 31 and sprocket 39 between the limits shown in FIGS. 1 and 2. The vacuum fingers, being rigidly secured to the manifold shaft 23 which is in turn rigidly secured to the sprocket 38, project vertically downwardly into the pan 16 when moved thereto for picking up articles (FIG. 2) and swing slightly outwardly away from the pan 16 to positions over the funnel 13 when moved to the opposite end of their path of travel for discharging articles into the funnel (FIG. 1).

Oscillation of the arms 31 for the purpose just described is effected by axial reciprocation of a vertically disposed actuating rod 42. The actuating rod 42 passes with a free sliding fit through a guide boss 43 mounted on the support post 37. An actuating piston 44 is fixed to the lower end of the actuating rod and a laterally projecting arm 46 is rigidly fixed to its upper end. The arm 46 projects and slides up and down between the spaced mounting plates 33 and is thereby held against any tendency of the arm and actuating rod 42 to rotate about the vertical axis of the latter. A link 47 is pivotally connected at its opposite ends to the projecting arm 46 and to the oscillating arm 31 and causes the latter to oscillate as the actuating rod 42 reciprocates vertically in an air cylinder 48.

The admission of air to the cylinder 48 from a pressurized air line 49 forces the piston 44 and actuating rod 42 upwardly to the upper ends of their strokes, whereupon the air pressure is cut off. Air is then permitted to be exhausted from the cylinder 48 as the piston and actuating rod descend by the combined effects of gravity and a spring 45, the rate of descent being controlled by restricting the outflow of air.

While a valve system for controlling reciprocation of the piston 44 and control rod 42 will be described in more detail hereinafter, with particular reference to the pneumatic and electrical circuits of FIG. 7, the several valves are shown in FIG. 1 in their physical relationship in the machine. As shown therein, a main air supply conduit 51, connected to any suitable source of air under pressure, feeds through an adjustable pressure regulating valve 52 to a connection with the air line 49 that supplies air to the cylinder 48. This supply of air is turned on and off by a three-way, solenoid actuated valve 53 interposed in the air line 49 and by an adjustable, throttling valve 54, also interposed in the air line 49 adjacent the cylinder 48. The throttling valve 54 is set to admit air to the cylinder 48 at a rate which will raise the actuating rod 42 quickly but smoothly so as not to shake or flip articles off of the ends of the vacuum fingers.

A third port of the three-way solenoid actuated valve 53 opens to atmosphere through another throttling valve 56, which is also adjustable to control the rate at which air is exhausted from the cylinder 48 by downward movement of the piston 44 and its associated parts. Because of the force required to raise the piston 44 and its associated parts against gravity and friction in the machine, only a relatively small throttling effect is desired from the throttling valve 54 for controlling the rate at which the piston 44 is raised. As a result, some additional throttling by means of the second throttling valve 56 is desired to cushion the downward movement of the piston 44, and the second throttling valve 56, functioning in series with the throttling valve 54, provides such additional throttling effect.

From the foregoing, it will be apparent that, actuation of the solenoid actuated valve 53 to supply air under pressure to the cylinder 48 raises the piston 44 and the actuating rod 42, and that reverse shifting of the solenoid actuated valve 53 cuts off the supply of air under pressure and permits the air in the cylinder 48 to be exhausted, thereby permitting the piston 44 and actuating rod 42 to drop. As will also be apparent from the foregoing, after the array of vacuum fingers has dipped into the pan 16 in response to dropping of the piston 44, and after the fingers have all engaged articles that are to be delivered into the funnel 13, so that the vacuum has been re-established in the fingers to hold the articles so engaged thereby, the piston rises in response to shifting of the solenoid actuated valve 53 so as to deliver air under pressure into the cylinder 48. This moves the fingers upwardly and laterally, while swinging them slightly, until their lower ends are disposed directly over the funnel 13. At this point, the vacuum supply to the vacuum fingers is terminated by actuation of valves, as hereinafter described, and, preferably, a momentary blast of air is forced therethrough. This causes the articles picked up by the vacuum fingers to drop into the funnel and be fed into the several box bottoms positioned therebelow. Thereupon, downward movement of the piston 44 and actuating rod 42 is permitted by shifting of the solenoid actuated valve 53, thereby causing the vacuum fingers to reverse their path of movement and return to the pan 16 for picking up more articles from the pan.

MULTIPLE COMPARTMENT FUNNEL 13

Figure 3:
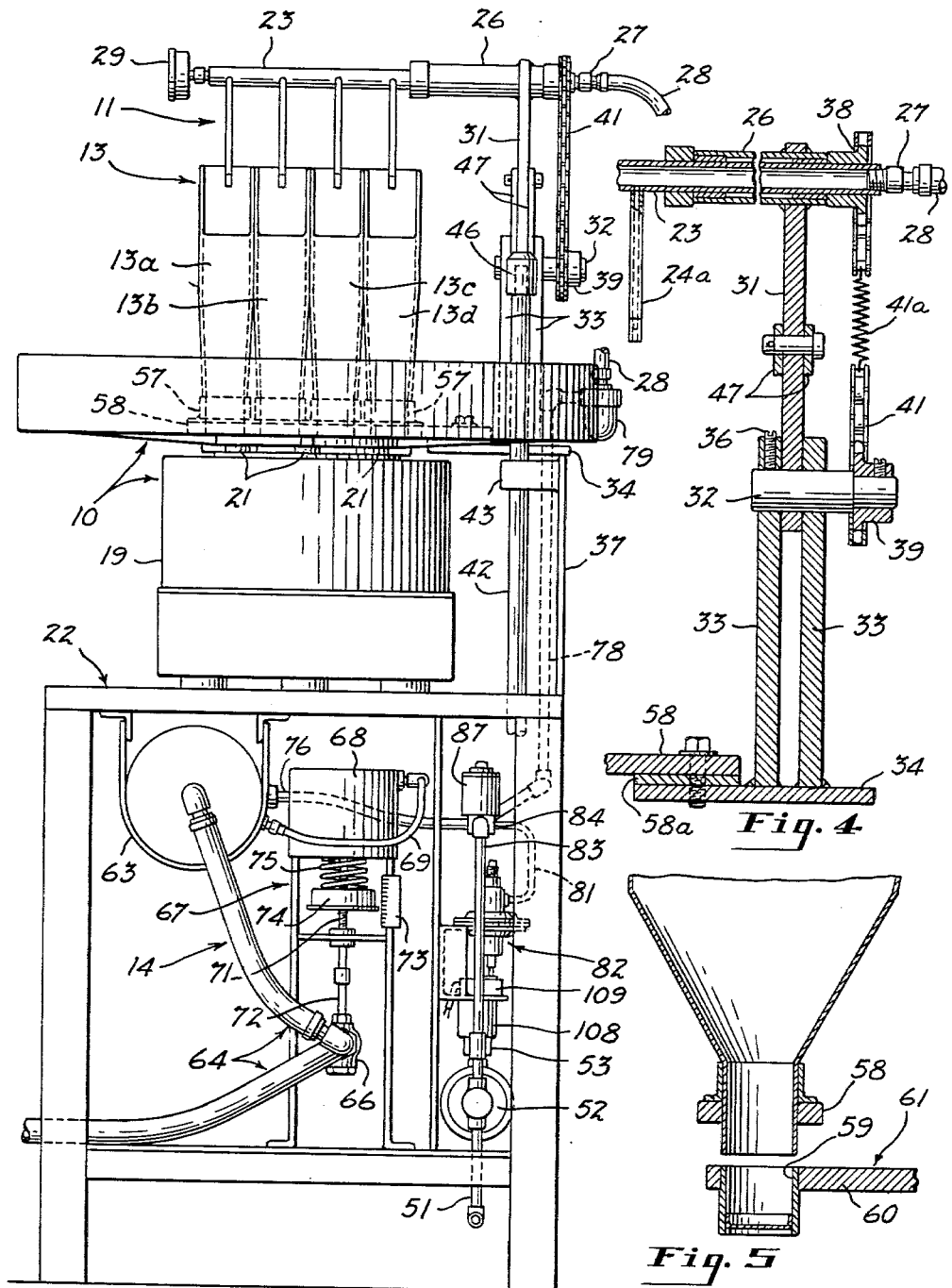
FIG. 3 is an end elevational view of the feeding machine of FIG. 1.

Referring now to FIGS. 1, 3 and 6, the multiple compartment funnel 13, in effect, comprises a number of individual funnel portions 13a, 13b, 13c, and 13d, that are disposed in side-by-side, contiguous relationship (FIGS. 3 and 6). Each of the individual funnel portions converges downwardly to an outlet throat 57 secured in a mounting plate 58. The mounting plate 58 is shown bolted to and supported by the support plate 34 that is, in turn, welded to the table post 37. A height adjusting spacer plate 58a may be disposed between the mounting plate 58 and support plate 34.

Each funnel throat 57, in this instance, is circular in horizontal cross-section and of a diameter substantially corresponding to the diameter of a round pocket 59 in a conveyor table 60 of a packaging machine, the latter being generally designated 61. As previously mentioned, each of the pockets of the packaging machine arriving below one of the funnel portions contains a box bottom previously positioned therein for receiving articles fed thereto from the funnel portion aligned therewith (FIG. 5).

Because the packaging machine conveyor table 60 is circular and rotates about its central axis, the multiplicity of pockets 59 disposed about the periphery thereof (FIG. 6) move along a circular path, and the two outer funnel compartments 13a and 13d are slightly offset relative to the two intermediate funnel compartments 13b and 13c (FIG. 6) so that the throats 57 of the four funnel portions may be respectively vertically aligned with four adjacent pockets of the packaging machine conveyor each time the conveyor stops to receive articles from the four funnel compartments.

During each cycle of movement of the vacuum fingers between the supply pan 16 and the multiple compartment funnel 13, the packaging machine conveyor table rotates four steps, each step corresponding to the angle subtended at the center of the table by a pair of adjacent pockets. Thus, each time four pockets that have last received articles are advanced in four steps to positions beyond the multiple compartment funnel, four additional pockets containing empty box bottoms are advanced into position below the multiple compartment funnel.

PNEUMATIC AND ELECTRICAL CONTROL SYSTEM 14

Referring first to the physical arrangement of the pneumatic portion of the control system (FIGS. 1 and 3), a vacuum tank 63 is mounted on the framework of the table 22 and is maintained in an evacuated condition by a main vacuum line 64 connected to a suitable vacuum pump (not shown). The main vacuum line 64 suitably has an adjustable throttling valve 66 interposed therein for adjusting the degree of vacuum maintained in the tank 63. As shown in FIGS. 3 and 7, the valve 66 is adjusted by a vacuum controlled mechanism, generally designated 67, which may be set to open or close the valve 66 the amount required to maintain a selected degree of vacuum in the vacuum tank 63. This vacuum controlled mechanism comprises a vacuum regulator 68 communicating with the vacuum tank 63 through a vacuum line 69 connected therebetween. The vacuum regulator 68 may be of a known type (such as that manufactured by Robertshaw Fulton Controls Co. of Knoxville, Tennessee) that is adjustable to maintain a desired degree of vacuum in the tank 63 by automatically opening and closing the throttling valve 66 in response to fluctuations in the degree of vacuum in the tank sensed through the vacuum line connection 69 between the tank and the regulator. Adjusting of the amount of opening of the throttling valve 66 is effected by longitudinal movement of an actuating rod 71 of the regulator that is directly coupled to a reciprocatable valve stem 72 of the throttling valve. The degree of vacuum to be maintained is indicated on a scale 73 by a flange (serving as a dial) on a seat 74 for a regulator loading spring 75, the seat 74 being threaded on the regulator actuating rod 71 for vertical travel thereon to adjust the compression of the loading spring.

For applying vacuum both to the vacuum fingers and to a diaphragm of a switch actuator 82 hereinafter described, another vacuum line 76 runs from the vacuum tank 63 through a solenoid controlled valve 77 and a branch line 78 into a dust filter unit 79 through which vacuum is pulled from the flexible vacuum hose 28 connected between the filter unit and the vacuum finger manifold shaft 23. The filter unit 79 serves to screen out any dust that may be sucked up into the vacuum fingers.

After passing through the solenoid actuated valve 77, the vacuum line 76 from the vacuum tank also connects to a second line 81 that communicates with the above mentioned diaphragm type, pressure-responsive switch actuator 82 for opening and closing a switch in an electrical circuit still to be described. The previously described air pressure line 51 that supplies air under pressure through the line 49 to the finger-actuating cylinder 48 also connects with an air pressure line 83 that passes through another solenoid actuated valve 84 to a T-coupling with the line 81 for applying air under pressure to the switch actuator 82 and with the vacuum line 78 leading to the array of vacuum fingers.

In the pneumatic system just described, the solenoid actuated valve 77 in the vacuum line 76 is normally open, and the solenoid actuated valve 84 in the air pressure line 83 is normally closed. As will hereinafter appear, whenever current is applied to a solenoid 86 for closing the valve 77 and cutting off the supply of vacuum to the vacuum fingers, current is simultaneously applied to a solenoid 87 for opening the air pressure valve 84 and delivering air under pressure to the vacuum fingers through the vacuum line 78 at the instant the vacuum therein is interrupted. This occurs only momentarily during each cycle of the machine to insure dropping of articles from vacuum fingers by forcing a momentary blast of air therethrough at the moment they are disposed above the multiple compartment funnel 13 for discharging articles therein. At all other times, for a reason that will appear hereinafter, the vacuum tank 63 is connected in open communication with the array of vacuum fingers.

Coordination of the various movements of the feeding and packaging machines is controlled by means of a pair of rotating cams 91 and 92 that rotate at the same speed and, for the purposes of the present invention, are most conveniently driven by the packaging machine motor 93 through a suitable power take-off. This is indicated in FIG. 7 by the square, dot-dash enclosure 94 within which the cams 91 and 92 are shown. Also shown within this enclosure 94 is the motor 93 that drives the packaging machine, the power take-off for driving the cams 91 and 92 being indicated by a dotted line running from the motor 93 through the cams 91 and 92. A pair of switches 95 and 96, respectively associated with the cams 91 and 92 for actuation thereby, and a relay 97 interposed in one of a pair of electrical power leads 98 and 99 to the motor 93 may also be mounted on the packaging machine 61, as indicated by including them within the same enclosure 94. A double pole switch 101, which is mounted on the feeding machine, is interconnected with the single pole switches 95 and 96 and relay 97 in an electrical control circuit for actuating the vacuum valve 77 and the air pressure valve 84 and for coordinating the operation of the two machines.

The double pole switch 101 is mounted on the frame of the feeding machine table 22 (FIG. 1) in a position to be actuated by upward movement of a flange 102 that is fixed on the actuating rod 42 for vertical reciprocation therewith. The flange 102 actuates the switch 101 when the actuating rod 42 reaches its upper limit of movement and the vacuum fingers have arrived at their discharge positions for dropping articles into the hopper 13, as shown in FIG. 1.

The aforementioned electrical control circuit is energized by a pair of electrical leads 103 and 104. The first of these leads 103 is connected through the cam actuated switch 95 on the packaging machine and through the double pole switch 101 on the feeding machine to both of the solenoids 86 and 87 that respectively actuate the vacuum valve 77 and the air pressure valve 84. The other terminals of these solenoids 86 and 87 are connected to the second electrical lead 104.

When the packaging machine is ready to receive articles, a high spot 106 on the cam 91 closes the switch 95. When the feeding machine is ready to discharge articles into the hopper 13, the switch 101 on the feeding machine is actuated from the condition shown in FIG. 7 by movement of the flange 102 from the position shown in phantom outline in FIG. 1 to the condition shown in solid lines in FIG. 1, whereby the solenoids 86 and 87 are energized so that the vacuum valve 77 is closed and the air pressure valve 84 is opened to blow articles off of the vacuum fingers into the hopper 13.

The circumferential length of the high spot 106 on the cam 91 corresponds to the period of time that the conveyor of the packaging machine remains stationary between its stepwise movements for receiving articles from the hopper 13 and for other purposes. If articles are ready to be discharged from the vacuum fingers into the hopper 13, the switch 101 will have been actuated as previously described for discharging the articles, but such discharge will not occur if the packaging machine conveyor has not yet stopped in position for receiving articles, since the cam actuated switch 95 will not yet have been closed to complete the necessary electrical circuit. Similarly, if the packaging machine conveyor has stopped in position for receiving articles and the switch 95 has been closed but the feeding machine is not yet ready to deposit articles into the hopper so that the double pole switch 101 has not yet been shifted, the article discharging circuit will also not be completed and the switch 95 must remain closed by the cam 91 until the switch 101 has been shifted. However, if it should be required that the switch 95 remain closed for longer than the period of time during which the high spot on the cam 91 will remain in contact with the switch 95, it is then necessary to stop the driving motor of the packaging machine until the feeding machine is ready to discharge articles. The second cam 92, its associated switch 96, the relay 97, and the double pole switch 101 on the feeding machine are interconnected for this purpose.

A high spot 107 of very short circumferential length on the perimeter of the cam 92 is located to close the switch 96 just before the cam 91 releases and opens the switch 95. This completes a circuit from the electrical lead 103 through the switch 95, the double pole switch 101 (which has not yet been shifted), the switch 96, and the relay 97 to the other electrical lead 104. When the relay 97 is thus energized, it opens the power circuit to the packaging machine motor 93 and stops the packaging machine until the feeding machine is ready to discharge articles and, therefore, has shifted the double pole switch 101. As will be seen from FIG. 7, this breaks the circuit to the relay 97 and permits the motor 93 to start again. At the same instant, since the cam actuated switch 95 is still closed and the double pole switch 101 on the feeding machine has been shifted, the feeding machine will discharge articles from the vacuum fingers through the hopper 13 into the pockets of the packaging machine before the cam 91 has released and opened the switch 95 and before the packaging machine conveyor has begun to advance. It will thus be seen that the feeding machine and packaging machine are interlocked so that the former cannot discharge articles until the packaging machine is ready to receive them and the latter cannot advance until the feeding machine has discharged articles to it.

Referring next to the pneumatic and electrical controls for shifting the solenoid controlled air valve 53, a solenoid 108 associated with this valve is connected to the electrical leads 103 and 104 through a switch 109 mounted on the feeding machine, and this switch is opened and closed, as required, by the diaphragm type switch actuator 82 previously mentioned, as indicated diagrammatically in FIG. 7. This switch actuator 82 is adjustable so that its diaphragm will move upwardly and close the switch 109 only when a predetermined, steady degree of vacuum is maintained in the line 81 leading thereto. When the switch 109 is closed by the actuator 82, the solenoid 108 is energized to shift the air valve 53 to supply air under pressure from the air line 49 through the throttling valve 54 to the cylinder 48. The required degree of vacuum for this purpose will exist and remain steady only when the vacuum fingers have all engaged articles in the pan 16 so that the end openings in all of the vacuum fingers are closed and the vacuum is not lost therethrough.

The supply of air to the cylinder 48 starts the piston 44 and actuating rod 42 on their upward travel and the vacuum fingers on their travel, if any one or more of the articles held on the ends of the vacuum fingers should fall and thereby open the associated vacuum finger or fingers, the degree of vacuum maintained at the diaphragm of the switch actuator 82 is immediately reduced, the switch 109 is opened thereby, the solenoid 108 is de-energized, and the air valve 53 is shifted to open the air exhaust passageway from the cylinder 48 through the throttling valves 54 and 56 to the atmosphere. Thereupon, the piston 44 and actuating rod 42 drop, and the vacuum fingers are returned to the pan 16 for again picking up articles and re-establishing the required degree of vacuum at the diaphragm of the switch actuator 82. This will be repeated over and over again if, for any reason, the vacuum fingers should fail to carry all of the articles picked up thereby to their discharge positions over the hopper 13. Thus, the feeding machine will never complete its cycle so as to permit advancing of the packaging machine unless each vacuum finger has discharged an article into the hopper 13.

As previously explained, arrival of the vacuum fingers in their article discharging positions with an article held on each of them is accompanied by simultaneous shifting of the double pole switch 101, closing of the vacuum valve 77, and opening of the air pressure valve 84 so as to discharge air through the vacuum fingers and insure the release of the articles therefrom. Obviously, since the vacuum line 81 leading to the diaphragm of the switch actuator 82 is also connected to the outlet port of the air pressure valve 84, the resulting disruption of the vacuum at the diaphragm of the switch actuator causes its diaphragm to move downwardly and open the switch 109 so as to de-energize the solenoid 108 and shift the valve 53 for exhausting air from the cylinder 48, thus permitting the actuating rod 42 to drop and the vacuum fingers to return to the pan 16 for picking up additional articles.

As mentioned above, the vacuum tank 63 is connected in open communication with the vacuum fingers at all times except momentarily during the discharge of articles into the hopper 13. This is necessary not only for holding articles on the ends of the fingers as they move toward the hopper 13, but also to permit air to be sucked into the fingers and disrupt the vacuum at the diaphragm of the switch actuator 82 for causing return of the fingers to the pan 16, as just explained.

As previously explained, the vacuum control unit 67 is adjustable to maintain a selected degree of vacuum in the vacuum tank 63 by automatically adjusting the throttling valve 66 in the vacuum line 64. The switch actuator 82 must also be adjusted to respond by closing the switch 109 whenever it is exposed to the particular degree of vacuum maintained in the tank 63. For this purpose, the diaphragm of the switch actuator 82 is adjustably loaded by a spring 82a shown diagrammatically by dotted lines in FIG. 7, and the force exerted by this spring is manually adjusted by means of an adjusting bolt or screw 112 in the top of the switch actuator unit (FIG. 1). As a result of this adjustability and the adjustability of the degree of vacuum maintained in the vacuum tank 63, the pneumatic and electrical control system of FIG. 7 adapts the feeding machine for operation while using any degree of vacuum conveniently available within a substantial range. Also, the adjustability of the air pressure reducing valve 52 and throttling valves 54 and 56 in the air supply and exhaust lines that communicate with the air cylinder 48 permit the machine to be connected to and operated satisfactorily with any air pressure conveniently available above a minimum pressure required to raise the piston 44 and actuating rod 42 at the desired rate of speed.

SUMMARY RE FIGS. 1–7

From the foregoing description of the embodiment of the invention illustrated in FIGS. 1–7, it will be apparent that a feeding machine has been provided that admirably achieves the various objectives set forth above herein. However, in order to indicate some of the variations of the invention that will occur to one skilled in the art, but which do not depart from the principles and scope of the invention, the physically modified form of the invention and the modified control system therefor which are shown in FIGS. 8–17 will now be described.

MACHINE OF FIGS. 8–16

Referring to FIGS. 8–16 of the drawings, the main components of this embodiment of the feeding machine are similar in character and function to those of the feeding machine of FIGS. 1–7 and include:

(1) A rotating pan and article distributing assembly, generally designated 110, that is adapted to hold and move a supply of articles to the vacuum fingers of the feeding machine. As before, the articles to be fed may be delivered loosely in bulk into the pan in any desired manner. The article distributing portion of the assembly feeds articles into the pan entirely about the axis of the pan and in a radially outward direction into an annular trough formed in the pan. This maintains a supply of articles substantially uniformly distributed over the trough portion of the pan.

(2) An assembly 111 of two groups of vacuum fingers, there being three vacuum fingers in each group.

(3) A mechanism 112 for supporting and moving the vacuum fingers between pick-up and discharge positions. In their pick-up positions, the vacuum fingers have been lowered to depend vertically downwardly into the supply pan for engaging articles to be picked up thereby. In their discharge positions, the fingers have been moved upwardly and outwardly beyond the periphery of the supply pan so as to dispose the groups of fingers, respectively, above a pair of compartments of a dual compartment funnel for dropping the articles from the fingers of any one group into the funnel compartment therebelow.

(4) The dual compartment funnel 113 through which articles are simultaneously dropped from the vacuum fingers and from which the articles are received by any desired receiver, such as a packaging machine.

(5) A pneumatic and electrical control system 114 connected to the fingers of the vacuum finger assembly 111 for supplying vacuum thereto while they are picking up articles and delivering them to points above the compartments of the dual compartment funnel 113, and for substituting air pressure for the vacuum in the vacuum line to the vacuum fingers when the fingers are in position for dropping articles into the compartments of the funnel. As in the embodiment of the invention shown in FIGS. 1–7, this control system also controls the movement of the vacuum fingers and coordinates the operation of the feeding machine and a packaging machine or the like. This control system performs essentially the same functions in essentially the same manner as the control system of the apparatus of FIGS. 1–7 and involves the same or functionally similar pneumatic and electrical circuits.

Except as the details of this embodiment of the invention are essentially the same as those of the embodiment previously described, each of the above-identified main components of the feeding machine of FIGS. 8–16 will now be described in detail.

SUPPLY PAN AND ARTICLE DISTRIBUTING ASSEMBLY 110

The supply pan and article distributing assembly 110 may be mounted on top of a suitable table or framework, generally designated 115, that also carries the other components of the feeding machine. This assembly comprises a circular supply pan 116 shaped as shown in cross-section in FIG. 8 so as to provide an annular trough around an upwardly domed central portion from which an integrally formed mounting boss 117 depends. The mounting boss receives and is secured to a vertical, rotating sleeve 118 that is journaled and driven as hereinafter described for rotating the supply pan 116 at a relatively slow rate of speed.

A stationary, vertical shaft 119 has its lower end secured to the framework 115 by means of a flanged fitting 121. This stationary shaft projects upwardly through the rotating sleeve 118 and therebeyond for supporting the article distributing structure. The article distributing structure includes a generally cylindrical, preferably transparent, molded plastic, tubular shell 122 that is flared outwardly at its upper and lower ends to provide a funnel portion 123 at its upper end to facilitate dumping articles into the shell and a skirt portion 124 at its lower end that defines an annular passageway between the skirt portion of the shell and the domed central portion of the pan 116. The shell 122 is supported upon the vertical, stationary shaft 119 by means of an inverted, cup-like cap or hub 126 that receives the upper end of the shaft and by a plurality of radiating spokes 127 that are of sufficient vertical depth to rigidify the mounting of the shell 122 without the need for additional lateral bracing.

The rotating sleeve 118 for driving the supply pan 116 is supported and journaled in an elongated bushing 128 mounted in the framework 115, vertical support for the pan being provided by a flange 129 welded on the sleeve and by a second flange 131 welded on the bushing 128 and resting on the framework 115. The sleeve 118 projects through and sufficiently below the bushing 128 for a beveled driving gear 132 to be secured to the sleeve. The beveled gear 132 is driven by a beveled pinion 133 on the output shaft of a speed-reducing unit 134, which is powered by a motor 136 through a first belt 137, an idling shaft 138 carrying driven and driving pulleys, and a second belt 139.

The plastic shell 122 may be filled with articles to be fed by the feeding machine and refilled at intervals, as required. Rotation of the supply pan 116 relative to the stationary shell assists in the downward movement of articles through the passageway between the lower skirt portion 124 of the shell and the upwardly domed central portion of the pan as the level of articles in the annular trough defined by the pan is reduced by the removal of articles therefrom by the vacuum fingers, as hereinafter described.

ASSEMBLY 111 OF VACUUM FINGERS

The assembly 111 of vacuum fingers, best shown in elevation in FIG. 12 and in plan in FIG. 15, includes in this instance, two groups of three vacuum fingers each. The six vacuum fingers are identical in this case, and each is designated by the same reference character 141. The two groups of vacuum fingers are respectively mounted adjacent the free ends of a generally U-shaped hollow tube 142, the passageway through this tube being closed at the ends thereof. Two of the fingers in each group are mounted directly on the U-shaped tube and in communication therewith, and the third finger of each group is similarly mounted on a short branch tube 143 that is closed at its free end and secured at its opposite end to and in communication with the U-shaped tube.

The U-shaped, vacuum finger-supporting tube 142, at a location close to the U-bend therein, straddles a mounting hub 144 to which it is rigidly secured, and the mounting hub is, in turn, rigidly secured on the upper end of a vertical, actuating shaft 146 mounted for both vertical reciprocation and axial oscillation and forming a part of the mechanism generally designated 112 for supporting the vacuum fingers and moving them between their pick-up and discharge positions.

VACUUM FINGER MOVING MECHANISM 112

For reversibly lifting and swinging the vacuum fingers from their pick-up positions to their discharge positions, the vertical, actuating shaft 146 passes with a free sliding fit through a guide boss 147 mounted in a top plate 148 of the framework 115 and through a lower guide bracket 149 also mounted on the framework 115. Below the guide bracket 149, the lower end of the actuating shaft 146 has a flanged sleeve 150 partially threaded thereon (FIG. 11) and projecting therebeyond to receive a bearing ball 151 that is seated in a hemispherical recess in the end of the actuating rod and to receive the upper end of a piston rod 152 having a more shallow ball seat formed therein. A piston 153 is secured to the lower end of the piston rod 152 for vertical reciprocation in an air cylinder 154 in response to the admission and exhausting of air into and out of the cylinder. A compression spring 156 surrounding a lower portion of the actuating shaft 146 and held under compression between the sleeve 150 and the lower guide bracket 149, urges the actuating shaft downwardly against the bearing ball 151 with a sufficient force to insure downward movement of the shaft and ball upon lowering of the piston rod. The ball 151 performs an important bearing function in reducing frictional resistance to oscillation of the actuating shaft about its axis as it reciprocates vertically with the piston 153 and piston rod 152.

In order to oscillate the actuating shaft 146 as it rises and falls, for swinging the vacuum fingers back and forth between their pick-up and discharge positions, a cam member 158 (FIGS. 10 and 14) is mounted adjacent the actuating shaft in a corner of the framework 115. This cam member is shaped to provide a generally vertical cam slot 159 that receives a cam roller follower 161 rotatably mounted on a sleeve 162 fixed on the actuating shaft between the guide boss 147 and lower guide bracket 149. The cam slot 159, as shown in FIG. 14 extends vertically for approximately the lower two-thirds of its length and then curves laterally while conforming to a cylindrical zone of oscillation of the cam roller follower about the axis of the actuating shaft. As the actuating shaft is raised by the piston 153 and piston rod 152, the cam roller follower moves vertically upwardly in the slot 159 so that the vacuum fingers are first moved vertically upwardly from the trough of the supply pan 116. As the height of the lower ends of the vacuum fingers approaches the height of the upper rim of the pan 116, the cam roller follower enters the laterally curving portion of the cam slot 159 and rotates the actuating shaft as the latter continues upwardly to the limit of its upward movement, thereby swinging the vacuum fingers toward the dual compartment funnel 113 as the raising of the vacuum fingers continues to their maximum elevation at their discharge positions over the funnel. This upward movement and rotation of the actuating shaft 146 is effected by admitting air under pressure into the cylinder 154 below the piston 153 to force the piston upwardly. Air is then permitted to be exhausted from the cylinder 154 as the actuating shaft, piston rod, and piston descend by gravity, aided by the force exerted by the compression spring 156. As in the first described embodiment of the invention, the rate of this descent is controlled by restricting the outflow of air from the cylinder 154.

The air pressure system and associated valving for introducing air under pressure into the cylinder 154 to raise the piston 153 and for controlling the exhausting of air from the cylinder are shown in their physical arrangements in FIG. 8. They essentially correspond to the air pressure system and associated valving in the previously described embodiment of the invention. To the extent that there is such correspondence, corresponding reference characters have been used in FIG. 8 so that it will be unnecessary to redescribe the duplicated air pressure system and valving.

DUAL COMPARTMENT FUNNEL 113

Referring to FIGS. 8, 12, and 15, the dual compartment funnel 113 comprises a downwardly converging shell portion 167 divided into two compartments by an intermediate baffle 168 and opening downwardly on opposite sides of the baffle to a pair of cylindrical throats 169 that are spaced apart the same distance as a pair of adjacent pockets 59 of the packaging machine table 60. About the open upper end of the funnel shell 167 is an upward extension 170 about three sides of the converging shell portion 167 so as to provide an opening into the funnel that opens both upwardly and laterally toward the supply pan 116. Preferably, a lip 171 on the funnel shell portion 167 projects laterally outwardly and slightly over the rim of the pan 116 to prevent articles from falling between the funnel and the pan.

The funnel structure may be supported by a pair of legs 172 that are secured at their upper ends in bosses 173 at opposite sides of the funnel structure. The lower ends of the legs 172 may pass through apertures in a pair of lateral extensions 174, respectively, of the top plate 148 of the framework 115 (FIGS. 12 and 15). Mounting of the legs 172 in the apertures of the extensions 154 for vertical adjustability of the funnel structure is suitably accomplished by means of a pair of adjusting nuts on each of the legs, as shown.

As may be most clearly seen by reference to FIGS. 15 and 16, the vacuum fingers may be moved from their pick-up positions in which their lower ends dip into the pan 116, as shown in solid outline in these two figures, by a combination of raising and lateral swinging thereof to their discharge positions shown in phantom outline in FIG. 16. Each group of three articles dropped into a funnel compartment in this manner falls downwardly through the throat 169 thereof into a box bottom previously positioned in a pocket 59 of the packaging machine conveyor table 60. Box bottoms in two adjacent pockets of the packaging machine conveyor are filled simultaneously, and, between each such filling operation, the packaging machine conveyor table rotates about its axis through an angle that is twice the angular spacing between adjacent pockets. Accordingly, with proper timing of the operation of the feeding machine and with coordination of such operation and stepwise advancement of the packaging machine conveyor table, three articles are dropped into box bottoms in each successive pair of pockets in the packaging machine conveyor table as its stepwise advancing continues.

PNEUMATIC AND ELECTRICAL CONTROL SYSTEM 114

The pneumatic and electrical control system 114, as illustrated in FIG. 17, involves only relatively minor departures from the corresponding system in the previously described embodiment of the invention. Accordingly, FIG. 17 has been somewhat simplified by omitting therefrom the packaging machine motor 93, cams 91 and 92 driven therefrom, switches 95 and 96 respectively associated with the cams 91 and 92, and the relay 97 as shown in FIG. 7 within the dotted line enclosure 94. It is intended that these omitted components of the electrical system of FIG. 7 may be connected into the system of FIG. 17, as indicated therein, for operation in the same manner as in the control system of FIG. 7.

The principal difference between the control systems of FIGS. 7 and 17 is the substitution of a vacuum pump, surge tank and interconnecting vacuum lines in the system of FIG. 17 for the vacuum tank 63, vacuum throttling valve 66, vacuum regulator 67, and interconnecting vacuum lines 64 and 69 shown in FIG. 7. Thus, as physically shown in FIG. 8 and diagrammatically shown in FIG. 17, a vacuum pump 176, mounted on the frame 115 of the feeding machine, supplies vacuum to the solenoid actuated vacuum valve 77 through the vacuum line 76. A surge tank 177 is connected through a branch conduit 178 into the same vacuum line 76 for stabilizing the vacuum supply.

The double pole, limit switch 101 that is part of the interlock of the feeding and packaging machines is mounted on the framework 115 adjacent the actuating shaft 146 for actuation by the collar 150 thereon when the actuating shaft reaches the upper limit of its travel and the vacuum fingers actuated thereby reach their discharge positions. The switch 101 is connected into the electrical control circuit of the feeding machine in the same manner as in the previously described embodiment of the invention, and the three conductors leading from this electrical circuit and shown in FIG. 17 as running to the packaging machine serve the same function as the corresponding conductors in the electrical circuit of FIG. 7. Thus, the operation of the feeding machine and of the packaging machine are interlocked in the same manner as in the previously described embodiment of the invention.

As should be apparent from the foregoing, the differences between the control system for the machine of FIGS. 8–16 and the one for the machine of FIGS. 1–7 involve no basic difference in the mode of operation of the two machines. In both, the vacuum fingers, after picking up articles from the supply pan and thereby activating the vacuum responsive controls for moving the fingers to their discharge positions, will continue to move toward those positions only so long as each finger continues to hold an article. If any one of the fingers drops the article picked up thereby, the vacuum in the vacuum system is disrupted sufficiently to deactivate the finger moving mechanism and cause the fingers to return to the supply pan so that the finger which has dropped an article can again pick up one. This will be repeated over and over again if, for any reason, any one or more of the vacuum fingers should fail to carry the article or articles picked up thereby completely to the discharge positions of the fingers over the hopper that feeds the packaging machine. Thus, the feeding machine of this embodiment of the invention, like the machine of the preceding embodiment of the invention, will never complete its cycle so as to permit advancing of the packaging machine unless each vacuum finger has discharged an article into the hopper 113.

As in the preceding embodiment of the invention, the feeding machine and the packaging machine are also interlocked so that the former will not discharge articles to the latter until the latter has advanced and is ready to receive articles, and the latter will not advance again, until the feeding machine has discharged articles thereto through the feeding machine hopper. Complete reliability of the machine, so long as it continues in operation, is thereby assured.

GENERAL SUMMARY

From the foregoing disclosure of two alternative embodiments of the invention, it will be appreciated that the invention is suitable for feeding any of a variety of different types of articles into each compartment of a multiple compartment feeding funnel and that, within obvious practical limits, any desired number of articles may be fed into each compartment of the funnel for feeding separate receptacles or locations of a receiving machine, such as a packaging machine. It will also be appreciated that, despite the possibility that, upon occasion, the vacuum fingers of the feeding machine may fail to pick up and hold articles until they can be dropped into the receiving funnel, the control system for this machine insures that any such failure will automatically be corrected without operator intervention and that the proper number of articles will be dropped into each compartment of the receiving funnel during each complete cycle of the feeding machine.

In addition, it will be appreciated that the control system provided by the present invention is adaptable to interlock the feeding machine of the invention with any of a variety of types of article receiving machines in a similar manner so that the feeding machine will not discharge articles until the receiving machine is ready to receive them and the receiving machine will not progress in its operation after reaching an article receiving condition until articles have been fed thereto by the feeding machine.

Finally, it will be recognized by those skilled in the art that the present invention accomplishes all of the foregoing results in a simple manner with compact machinery that may be produced at a moderate cost compared to the cost of the manual labor heretofore commonly employed to perform similar article feeding function.

While the invention has been illustrated by showing and describing two specific machines in detail, those skilled in the art will recognize that numerous changes may be made in such machines without departing from the true spirit and scope of the invention. Accordingly, the invention is not to be construed as limited by the details of the specific embodiments disclosed, except as required by the terms of the appended claims.

Having disclosed our invention, we claim:

1. An article feeding machine comprising, in combination:
   (a) a vacuum finger having a passageway therethrough from an open end of the finger for engaging and holding an article;
   (b) conduit means for connecting a source of vacuum to the opposite end of said passageway;
   (c) means mounting said finger for movement back and forth along a fixed path between article pick-up and article discharge locations;
   (d) actuating means operative upon a build-up of vacuum in the finger passageway and conduit means for actuating the mounting means to move the finger toward said discharge location;
   (e) means responsive to arrival of the finger at said discharge location for reducing vacuum existing in the finger passageway and conduit means; and
   (f) means responsive to the reduction of vacuum in the finger passageway and conduit means for reversing said actuating means to move the finger toward said pick-up location, including means responsive to the application of air under pressure for operating the actuating means in one direction, an associated air supply line, and a valve in the air pressure supply line that is operable between open and closed positions in response to changes in the degree of vacuum in the finger passageway and conduit means.

2. An article feeding machine according to claim 1 in which said means of paragraph (e) thereof for reducing vacuum existing in the finger passageway and conduit means comprises a supply of air under pressure and means actuatable to supply air under pressure into said conduit means.

3. An article feeding machine comprising, in combination:
   (a) a vacuum finger having a passageway therethrough from an open end of the finger for engaging and holding an article;
   (b) conduit means for connecting a source of vacuum to the opposite end of said passageway;
   (c) means mounting said finger for movement back and forth along a fixed path between article pick-up and article discharge locations and including biasing means urging said finger toward said article pick-up position;
   (d) actuating means operative only upon a build-up of vacuum in the finger passageway and conduit means for overcoming said biasing means and actuating the mounting means to move the finger toward said discharge location; and,
   (e) means responsive to arrival of the finger at said discharge location for reducing vacuum existing in the finger passageway and conduit means.

4. An article feeding machine comprising, in combination:
   (a) a plurality of vacuum fingers having passageways therethrough from open ends thereof for engaging and holding articles, the portions of said fingers at the open ends thereof being substantially parallel and disposed in spaced apart relationship;
   (b) conduit means connected to each of said vacuum fingers and to a common source of vacuum for applying vacuum to the passageways of said fingers;
   (c) means mounting said fingers for movement back and forth along a fixed path between article pick-up and article discharge locations;
   (d) pressure responsive actuating means operative upon a build-up of vacuum in the finger passageways and conduit means for actuating the mounting means to move the fingers toward said discharge location and operative upon reduction of vacuum in said finger passageway and conduit means for returning said fingers to said article pick-up location;
   (e) means responsive to arrival of the fingers at said discharge location for reducing vacuum existing in the finger passageways and conduit means.

5. An article feeding machine comprising, in combination:
   (a) a plurality of vacuum fingers having passageways therethrough from open ends thereof for engaging and holding articles, the portions of said fingers at the open ends thereof being substantially parallel and disposed in spaced apart relationship;
   (b) conduit means connected to each of said vacuum fingers and to a common source of vacuum for applying vacuum to the passageways of said fingers;
   (c) a conveyor for moving a layer of randomly oriented soft articles to be picked-up by said fingers along a fixed path;
   (d) means mounting said fingers for movement back and forth along a fixed path between an article pick-up location at which the fingers depend into engagement with a layer of articles on said conveyor and an article discharge location at which said fingers depend substantially vertically downwardly;
   (e) pressure responsive actuating means operative upon a build-up of vacuum in the finger passageways and conduit means for actuating the mounting means to move the fingers toward said discharge location and operative upon reduction of vacuum in said finger passageways and conduit means for returning said fingers to said article pick-up location;
   (f) means responsive to arrival of the fingers at said discharge location for reducing vacuum existing in the finger passageways and conduit means; and
   (g) a receptacle at said discharge location disposed vertically below said fingers for receiving articles dropped therefrom in response to reduction of the vacuum existing in the finger passageways during their travel to the discharge location.

6. An article feeding machine comprising, in combination:
   (a) a plurality of vacuum fingers having passageways therethrough from open ends thereof for engaging and holding articles, the portions of said fingers at the open ends thereof being substantially parallel and disposed in spaced apart relationship;
   (b) conduit means connected to each of said vacuum fingers and to a common source of vacuum for applying vacuum to the passageways of said fingers;
   (c) a conveyor for moving a layer of randomly oriented soft articles to be picked-up by said fingers along a fixed path;
(d) means mounting said fingers for movement back and forth along a fixed path between an article pick-up location at which the fingers depend into engagement with a layer of articles on said conveyor and an article discharge location at which said fingers depend substantially vertically downwardly;
(e) pressure responsive actuating means operative upon a build-up of vacuum in the finger passageways and conduit means for actuating the mounting means to move the fingers toward said discharge location;
(f) means responsive to arrival of the fingers at said discharge location for reducing vacuum existing in the finger passageways and conduit means;
(g) said pressure responsive actuating means being responsive to the reduction of vacuum in the finger passageways and conduit means for reversing said actuating means to move the fingers toward said pick-up location for picking up articles; and
(h) a multiple compartment receptacle disposed vertically below the vacuum fingers when they are at the discharge location, the compartments of said receptacle being respectively vertically aligned with at least one of said vacuum fingers for receiving an article from each vacuum finger aligned vertically therewith.

7. An article feeding machine comprising, in combination:
(a) a plurality of vacuum fingers having passageways therethrough from open ends thereof for engaging and holding articles, end portions of said fingers at the open ends thereof being substantially parallel and disposed in spaced apart relationship;
(b) conduit means connected to each of said vacuum fingers and to a common source of vacuum for applying vacuum to the passageways of said fingers;
(c) supply means for maintaining a layer of randomly oriented soft articles to be picked-up by said fingers;
(d) means mounting said fingers for movement back and forth along a fixed path between an article pick-up location at which the fingers depend into engagement with a layer of articles on said supply means and an article discharge location at which said fingers depend substantially vertically downwardly;
(e) pressure responsive actuating means operative only upon a build-up of vacuum to a predetermined value in the finger passageways and conduit means for actuating the mounting means to move the fingers toward said discharge location and responsive to reductions in vacuum below said predetermined value to return said fingers to said article pick-up location;
(f) means responsive to arrival of the fingers at said discharge location for reducing vacuum existing in the finger passageways and conduit means to below said predetermined value for reversing said actuating means to move the fingers to said pick-up location and keep them there until restoration of sufficient vacuum in the finger passageways and conduit means to render said actuating means operative to again move the fingers toward said discharge location;
(g) means responsive to the reduction of vacuum in the finger passageways and conduit means for reversing said actuating means to move the fingers toward said pick-up location for picking up articles; and
(h) a multiple compartment receptacle at said discharge location disposed vertically below said fingers at said location for receiving articles dropped therefrom in response to reduction of the vacuum existing in the finger passageways during their travel to the discharge location;
said fingers being arranged in spaced arrangement relative to the compartments of said receptacle so that at least one finger is aligned above each compartment of the receptacle and each receptacle will receive an article only from each finger aligned therewith when articles are dropped from all of the fingers by reduction of vacuum existing in the finger passageways and conduit means.

8. In combination, an article feeding machine, an article receiving machine, and a control system for coordinating the operation of the two machines, said article feeding machine comprising:
(a) a vacuum finger for picking up, transporting, and discharging articles;
(b) conduit means for connecting a source of vacuum to the vacuum finger;
(c) means mounting said finger for movement back and fourth along a fixed path between article pick-up and article discharge locations;
(d) actuating means operative upon a build-up of vacuum in said conduit means for actuating the mounting means to move the finger toward said discharge location;
(e) discharge means responsive to arrival of the finger at said discharge location for reducing vacuum existing in the conduit means; and
(f) reversing means responsive to the reduction of vacuum in said conduit means for reversing said actuating means to move the finger toward said pick-up location;
said article receiving machine comprising:
(1) a conveyor;
(2) a plurality of article receptacles mounted in spaced relationship along said conveyor; and
(3) drive means for said conveyor for advancing it stepwise to move said receptacles, one after another, to an article receiving position below the article discharge location of the fingers of said feeding machine and then beyond said article receiving position, and for stopping the conveyor for a predetermined time between each stepwise movement thereof;
and said control system comprising:
(i) means responsive to operation of the feeding machine for preventing advancing of the conveyor of the receiving machine until after the finger of the feeding machine has arrived at its discharge location for dropping an article into a conveyor receptacle previously stopped in an article receiving position; and
(ii) means responsive to operation of the receiving machine for incapacitating the discharge means of the feeding machine when no receptacle of the conveyor of the receiving machine is stopped in a position for receiving an article.

9. In combination, an article feeding machine, an article receiving machine and a control system for coordinating the operation of the two machines, said article feeding machine comprising:
(a) a vacuum finger for picking up, transporting, and discharging articles;
(b) conduit means for connecting a source of vacuum to the vacuum finger;
(c) means mounting said finger for movement back and forth along a fixed path between article pick-up and article discharge locations;
(d) actuating means operative upon a build-up of vacuum in said codnuit means for actuating the mounting means to move the finger toward said discharge location;
(e) discharge means responsive to arrival of the finger at said discharge location for reducing vacuum existing in the conduit means; and
(f) reversing means responsive to the reduction of vacuum in said conduit means for reversing said actuating means to move the finger toward said pick-up location;
said article receiving machine comprising:
(1) a conveyor;
(2) a plurality of article receptacles mounted in spaced relationship along said conveyor; and
(3) drive means for said conveyor for advancing it stepwise to move said receptacles, one after another, to an article receiving position below the article discharge location of the fingers of said feeding machine and then beyond said article receiving position, and for stopping the conveyor for a predetermined time between each stepwise movement thereof;
and said control system comprising:
  (i) means powered by said receiving machine and responsive to operation of the feeding machine for preventing advancing of the conveyor of the receiving machine until after the finger of the feeding machine has arrived at its discharge location for dropping an article into a conveyor receptacle previously stopped in an article receiving position; and
  (ii) means powered by the receiving machine and responsive to its position in its sequence of operations for incapacitating the discharge means of the feeding machine when no receptacle of the conveyor of the receiving machine is stopped in a position for receiving an article.

10. The combination of claim 9 in which the means of paragraph (i) thereof for stopping the drive means of the receiving machine comprises a cam operatively connected to said drive means of the receiving machine and a relay in a power circuit of the receiving machine, said relay being actuatable by said cam through a circuit that is closeable thereby to disrupt said power circuit and stop and drive means only when the feeding machine is not ready to drop an article at said discharge location.

11. The combination of claim 9 in which the means of paragraph (ii) thereof for incapacitating the discharge means of the feeding machine comprises a cam driven by the drive means of the receiving machine and a switch in a power circuit of the feeding machine, said switch being actuatable by said cam so as to maintain said circuit open when no receptacle of the receiving machine conveyor is in its receiving position.

12. The combination of claim 9 in which the means of paragraph (i) thereof for stopping the drive means of the receiving machine comprises a cam operatively connected to said drive means of the receiving machine and a relay in a power circuit of the receiving machine, said relay being actuatable by said cam through a circuit that is closeable thereby to disrupt said power circuit and stop said drive means only when the feeding machine is not ready to drop an article at said discharge location; and in which the means of paragraph (ii) thereof for incapacitating the discharge means of the feeding machine comprises a cam driven by the drive means of the receiving machine and a switch in a power circuit of the feeding machine, said switch being actuatable by said cam so as to maintain said circuit open when no receptacle of the receiving machine conveyor is in its receiving position.

13. An article feeding machine comprising, in combination:
  (a) a vacuum finger having a passageway therethrough from an open end of the finger for engaging and holding an article;
  (b) conduit means for connecting a source of vacuum to the opposite end of said passageway;
  (c) means mounting said finger for movement back and forth along a fixed path between article pick-up and article discharge location;
  (d) pressure responsive actuating means responsive to a build-up of vacuum to a predetermined value in the finger passageway and conduit means for actuating the mounting means to move the finger toward said discharge location and responsive to reduction of vacuum below a predetermined value in the finger passageway and conduit means for returning said finger to said article pick-up position; and,
  (e) means responsive to arrival of the fingers at said discharge location for reducing vacuum existing in the finger passageway and conduit means below said predetermined value.

References Cited by the Examiner

UNITED STATES PATENTS

| | | |
|---|---|---|
| 2,247,787 | 7/1941 | Schmidt. |
| 2,524,846 | 10/1950 | Socke. |
| 2,619,237 | 11/1952 | Socke. |
| 2,675,153 | 4/1954 | Weimer. |
| 2,691,472 | 10/1954 | Weimer. |
| 3,191,781 | 6/1965 | Fischer. |

FOREIGN PATENTS 58,620    4/1941    Denmark.

MARVIN A. CHAMPION, *Primary Examiner.*